United States Patent
Wang et al.

(10) Patent No.: US 7,437,435 B2
(45) Date of Patent: Oct. 14, 2008

(54) AUTOMATICALLY SETTING METHOD AND RELATED SYSTEM

(75) Inventors: Tsung-Pin Wang, Taipei (TW); Hsiao-Fen Lu, Taipei (TW); Lien-Hsun Chen, Taipei (TW)

(73) Assignee: Inventec Corporation (TW)

( * ) Notice: Subject to any disclaimer, the term of this patent is extended or adjusted under 35 U.S.C. 154(b) by 520 days.

(21) Appl. No.: 11/264,196

(22) Filed: Oct. 31, 2005

(65) Prior Publication Data

US 2007/0100970 A1    May 3, 2007

(51) Int. Cl.
G06F 15/16    (2006.01)
(52) U.S. Cl. ........................... 709/220; 709/219
(58) Field of Classification Search ......... 709/200–203, 709/217–227
See application file for complete search history.

(56) References Cited

U.S. PATENT DOCUMENTS

| | | | | |
|---|---|---|---|---|
| 5,835,727 A | * | 11/1998 | Wong et al. | ................. 709/238 |
| 5,848,233 A | * | 12/1998 | Radia et al. | ................... 726/13 |
| 6,070,242 A | * | 5/2000 | Wong et al. | .................... 726/23 |
| 7,200,678 B1 | * | 4/2007 | Bettadahalli et al. | ........ 709/245 |
| 2005/0010649 A1 | * | 1/2005 | Payne et al. | ................. 709/217 |

* cited by examiner

*Primary Examiner*—Moustafa M Meky
(74) *Attorney, Agent, or Firm*—Peter F. Corless; Steven M. Jensen; Edwards Angell Palmer & Dodge LLP

(57) ABSTRACT

An automatically setting method and related system for a network communications system having a remote console is disclosed. The method provides a network serving equipment having a management controller, and connects a network serving equipment through the network communications system to the remote console. The method sets the network serving equipment in a PXE mode, and sends request instructions to request IP address to the remote console after the network serving equipment is actuated, to acquire corresponding IP address. The network serving equipment sends IP request instructions to the remote console to request corresponding network parameter setting program. Then the network serving equipment executes the network parameter setting program instruction, and sets IP address parameters of the management controller according to the acquired IP address accordingly. A setting result is returned to the remote console, and the remote console is able to control the network serving equipment to execute operations.

11 Claims, 2 Drawing Sheets

US 7,437,435 B2

AUTOMATICALLY SETTING METHOD AND RELATED SYSTEM

BACKGROUND OF THE INVENTION

1. Field of the Invention

The present invention relates generally to an automatically setting technique and, more particularly, to an automatically setting method and related system capable of automatically setting relating network parameters of a network serving equipment so as to manage the network serving equipment remotely.

2. Description of the Background Art

An operating system of a personal computer (PC) is installed in a storage equipment such as a hard driver of the personal computer. In result, data are easily lost if the hard driver is old or virus-infected. Moreover, the hard driver, which bas a constant size, is not expandable. Lastly, it takes time to reboot the operating system.

A pre-boot executable environment (PXE) server is introduced to the PC market to overcome the above-mentioned problems. The PXE server is to be connected through a hub with a plurality of user hosts of a local network, which provides a pre-boot environment. Thus, the user host sets a system environment where the user host is located in advance and installs its operating system in a remote network After the remote network is build up, the operating system installed in the remote network can then boot the user host remotely. Before the user host installs its operating system in a server of the remote network to execute a remote booting operation with the PXE server, some steps have to be completed in advance. First, a Windows operating system, serving as an operating system kernel of the server, has to be installed in the server. However, without a baseboard management controller (BMC), neither a remotely installing function nor a non-hard driver booting function can work. Then, system management software is installed in the server. The system management software performs a BMC network address setting operation on each of the user hosts of the local network one by one. Lastly, remotely control the user hosts according to the BMC network address when the user hosts enter the local network.

However, the PXE server has some drawbacks, mainly because of the complicated setting procedures described above. When installing a PXE server to serve as a pre-boot environment for a remote operating system, the user host has to execute the complicated setting procedure in advance. If the user hosts of the local network adopt different operating systems, the setting procedure becomes more complicated and is difficult to be installed and integrated. Therefore, management personnel have to spend more time on setting amendment, which is contradict to a principle to pursuing high working efficiency.

In consequence, it becomes an important issue for designers to provide an automatically setting technique capable of enabling a server to control pre-booting operations of the user boots remotely, so as to save time for the management personnel and reduce management cost.

SUMMARY OF THE INVENTION

Accordingly, it is an objective of the present invention to solve the aforementioned problems of the prior art by providing an automatically setting method and related system, both of which are capable of setting corresponding parameters of a network serving equipment automatically, so as to save setting time.

Another objective of the present invention is to provide an automatically setting method and related system having simplified setting procedures.

Another objective of the present invention is to provide an automatically setting method and related system of low cost.

In order to attain the object mentioned above and the others, an automatically setting method and related system according to the present invention are proposed. The automatically setting method includes (1) providing a network serving equipment comprising a management controller, and connecting the network serving equipment through a network communications system to a remote console, (2) setting the network serving equipment to an operating system able to be executed in a pre-boot execution environment (PXE) mode, (3) actuating the network serving equipment to issue a request instruction for distributing an IP address to the remote console, to acquire a corresponding IP address, (4) issuing a network parameter setting instruction to the remote console so that the network serving is able to acquire a corresponding network parameter setting program, (5) enabling the network serving equipment to execute the network parameter setting program, and to set an IP address parameter of the management controller according to an acquired IP address information, and (6) issuing the set IP address parameter to the remote console, to support the remote console to control through the network communications system the network serving equipment to execute corresponding operations, wherein the remote console further includes a dynamic host configuration Protocol (DHCP) server and an ESMS server.

The automatically setting system of the present invention includes a remote console and a network serving equipment having a management controller, wherein the network serving equipment issues a request instruction through the network communications system to the remote console, to acquire corresponding IP address information and network parameter setting to set EP address information of the network controller, and to return a setting result to the remote console, for the remote console to control through the network communications system the network equipment to execute corresponding operations. The remote console includes a DHCP server for providing a DHCP Service, and an ESMS server for providing a PXE service and an ESMS service. The network serving equipment is set in a PXE mode.

In contrast to the prior art, the automatically setting method and related system of the present invention uses the network communications system to set corresponding network parameters of the network serving equipment, so as to attain the objective of the controlling of the network serving equipment remotely. Therefore, management personnel do not have to spend more time on setting amendment, and the management cost is reduced dramatically.

DESCRIPTION OF THE PREFERRED EMBODIMENTS

The following description contains specific information pertaining to the implementation of the present invention. One skilled in the art will readily recognize other advantages and features of the present invention after reviewing what specifically disclosed in the present application. It is manifest that the present invention can be implemented and applied in a manner different from that specifically discussed in the present application. It should also be understood that the invention is not limited to the particular exemplary embodiments described herein, but is capable of many rearrangements, modifications, and substitutions without departing from the spirit of the present invention. Wherein, attention that the drawings according to the present invention are all simplified schematic diagrams should be paid to, i.e. they merely illustrate the components pertaining to the invention, and it is not limited to the components what illustrated, the number of the components, shape or proportion of size when actually implementing is a selective design, the layout of the component may be more complex.

The following embodiments further describe the technique means of the present invention in detail, but it is not used to limit the scope of the present invention.

Figure 1:
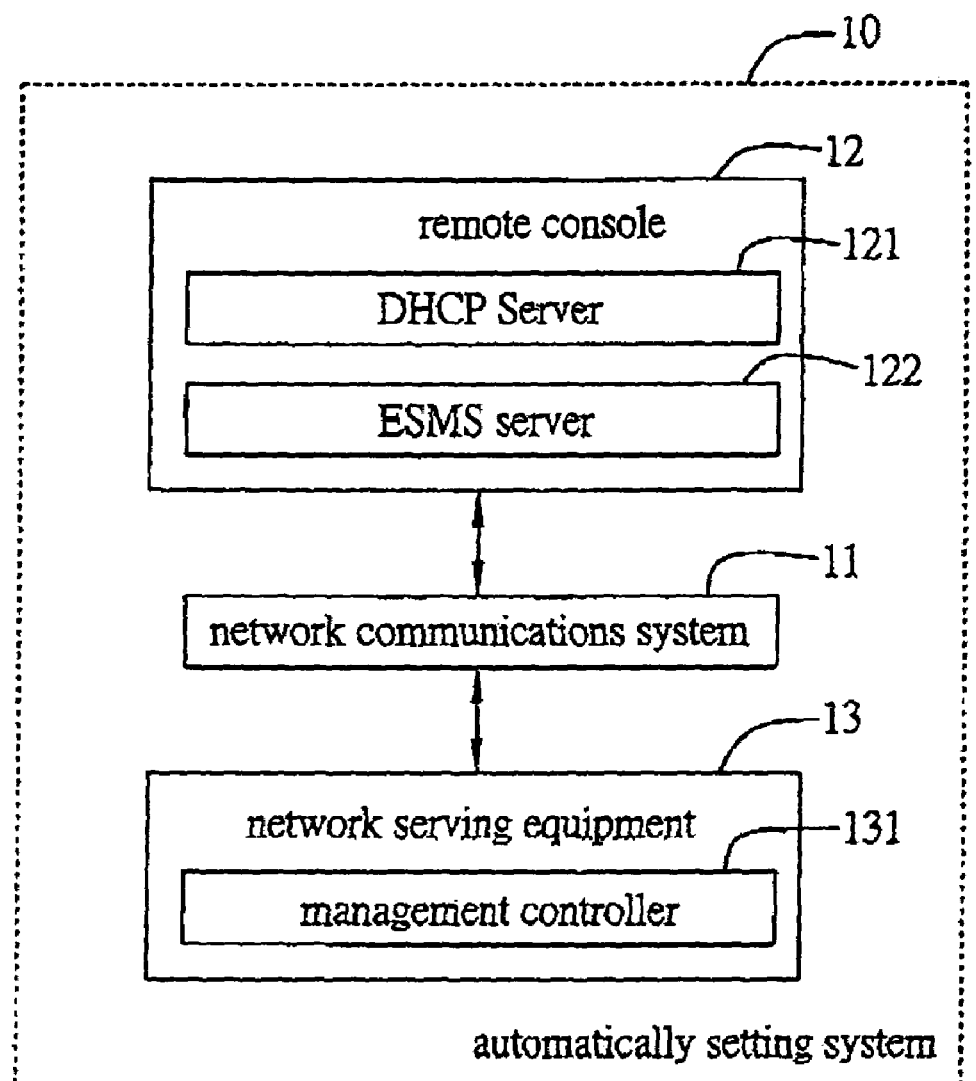
FIG. 1 is a functional block diagram of an automatically setting system of the preferred embodiment according to the present invention.

Please refer to FIG. 1, which is a functional block diagram of an automatically setting system 10 of the preferred embodiment according to the present invention. The automatically setting system 10 comprises a remote console 12, and at least a network serving equipment 13. The network serving equipment 13 sends request instructions through a network communications system 11 to the remote console 12, to acquire corresponding IP address and a network parameter setting program, which is used to set IP addresses of a management controller 13 of the network serving equipment 13. A setting result will be send back to the remote console 12 so that the remote console 12 is able to through the network communications system 11 to control the network serving equipment 13 to execute corresponding operations.

The remote console 12 comprises a DHCP server 121 and an ESMS server 122. When receiving request instructions issued by user clients, that is the network serving equipment 13 according to the preferred embodiment, the DHCP server 121 sends an corresponding IP address immediately, to detect if an IP address conflict happens among the user clients. The ESMS server 122 provides a PXE service and an ESMS Service, both of which will be explained in the following paragraphs.

The network serving equipment 13 comprises the management controller 131. According to the preferred embodiment, the management controller 131 is a BMC, and the network serving equipment 13 is set in a set in a pre-boot execution environment (PXE) mode.

Figure 2:
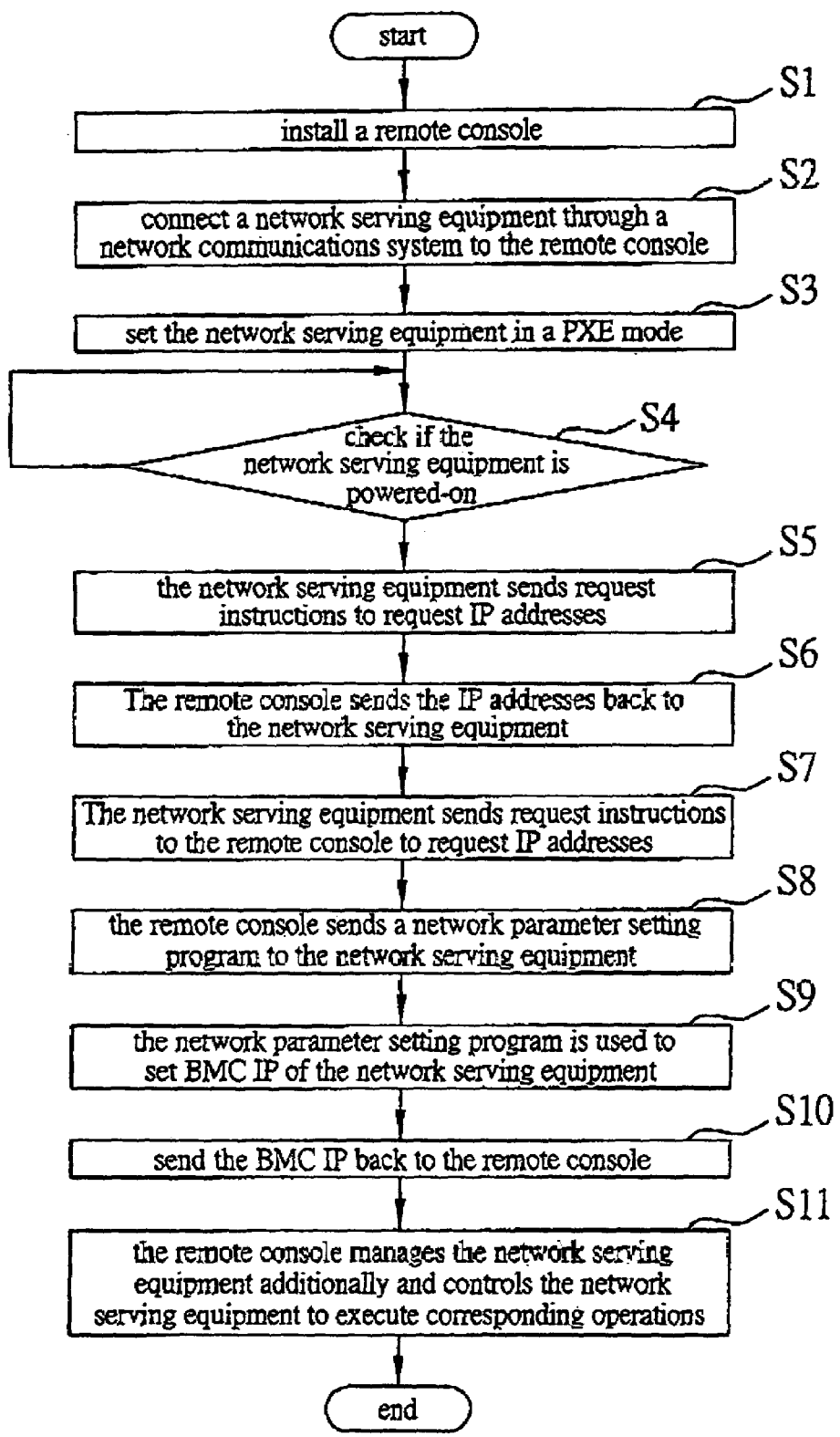
FIG. 2 is a flow chart of an automatically setting method according to the present invention.

Please refer to FIG. 2, which is a flow chart of an automatically setting method according to the present invention. The automatically setting method of the present invention is applied to an automatically setting system 2 comprising the remote console 12, the network serving equipment 13, which is connected through a network communications system 11 with the remote console 12. The network communications system 11 is an Intranet system, an Extranet system or am Internet system. The automatically setting method of the present invention uses the remote console 12 to set corresponding network parameters of the network serving equipment 13 automatically when the network serving equipment 13 is connected to the network communications system 11, so as to attain the objective to remotely controlling (monitoring) the network serving equipment 13.

As shown in FIG. 2, step S1 is a start step of the automatically setting method. In step S1, a remote console 12 is installed, and a DHCP server 121 and an ESMS server 122 are installed in the remote console 12. According to the embodiment, the DHCP 121 is used to provide a DHCP Service for IP address and detect if an IP address conflict happens, and the ESMS Server 122 is used to provide a PXE Service and an ESMS Service. Since the operations of the DHCP server 121 and the ESMS server 122 are known by the skilled, further description hereby omitted.

In step S2, which is executed after step S1, a network serving equipment 13 is introduced, and the network serving equipment 13 is connected through the network communications system 11 to the remote console 12. The network serving equipment 13 comprises a management controller 131. According to the embodiment, the management controller 131 is a BMC capable of supporting an IMPI data transmission standard.

In step S3, which is executed after step S2, the network serving equipment 13 is set in a PXE mode. Under the PXE mode, the network serving equipment 1, after being powered-on, reads, instead of executing a locally actuating process, corresponding information through the use of the DHCP server 121 of the remote console 12, so as to realize a remotely powering-on operation, that is the non-bard driver booting function.

In step S4, which is executed after step S3, whether the network serving equipment 13 is powered-on is to be determined. If the network serving equipment 13 is powered-on, then go to step S5, else execute step S4 repeatedly.

In step S5, the network serving equipment 13 sends the request instructions to the DHCP server 121 of the remote console 12, to request the DHCP server 121 for an IP address In step S6, which is executed after step S5, after receiving the request instructions, the DHCP server 121 of the remote console 12 generates a corresponding IP address randomly, and sends the randomly generated IP address back to the corresponding network serving equipment 13.

In step S7, which is executed after step S6, after receiving the IP address, the network serving equipment 13 sends again request instructions to the ESMS server 122 of the remote console 12, to request the ESMS server 122 to send a network parameter setting program, which is used to set corresponding network execution parameters. According to the embodiment, the network parameter setting program is a system management software (SMS) program.

In step S8, which is executed after step S7, after receiving the request instructions, the ESMS server 122 of the remote console 12 sends corresponding SMS program back to the corresponding network serving equipment 13.

In step S9, which is executed after step S8, the network serving equipment 13 executes the received SMS program, to set corresponding network parameters of the management controller 131. According to the embodiment, the SMS program is used to set the requested IP address to IP address information fields (BMC IP) of the BMC 131.

In step S10, which is executed after step S9, the network serving equipment 13 sends the set BMC IP back to the ESMS server 122 of the remote console 12.

In step S11, which is executed after step S10, the ESMS server 122 manages the network serving equipment 13 additionally, and remotely controls the network serving equipment 13 to execute corresponding operations, such as the remotely installing function and the non-hard driver booting function.

Of the automatically setting system and method, when the network serving equipment 13, which comprises the management controller 131, is connected to the network communications system 11 and is powered-on, the remote console 12 is able to set corresponding network parameters of the management controller 131 automatically. Thus a user is able to control the network serving equipment 13 to execute corresponding operations through the remote console 12. Therefore, the management personnel do not have to spend more time on setting amendment, and the management cost is reduced dramatically.

By virtue of the above-discussed indicating system and method, the user can conveniently and exactly implement corresponding operation by the indicating function with multiple forms without complex ibulgeifying operation, and can adroitly grip the operating function of the electronic device.

The above-described exemplary embodiments are to describe various objects and features of the present invention as illustrative and not restrictive of the scope of the essential technical content according to the present invention, the essential technical content of the present invention is broadly defined in the appended claim, if the exemplary embodiments or method implemented by any one are completely identical to the following claim or only an equivalent change of the following claim, all that is considered to fall with the scope of the invention.

What is claimed is:

1. An automatically setting method comprising:
    (1) providing a network serving equipment comprising a management controller, and connecting the network serving equipment through a network communications system to a remote console;
    (2) setting the network serving equipment to an operating system able to be executed in a pre-boot execution environment mode;
    (3) actuating the network serving equipment to issue a request instruction for distributing an IP address to the remote console, to acquire a corresponding IP address;
    (4) issuing a network parameter setting instruction to the remote console so that the network serving is able to acquire a corresponding network parameter setting program;
    (5) enabling the network serving equipment to execute the network parameter setting program, and to set an IP address parameter of the management controller according to an acquired IP address information; and
    (6) issuing the set IP address parameter to the remote console, to support the remote console to control through the network communications system the network serving equipment to execute corresponding operations.

2. The automatically setting method of claim 1, wherein the remote console comprises a dynamic host configuration protocol (DHCP) server and an environmentally sustainable management system (ESMS) server.

3. The automatically setting method of claim 2, wherein the DHCP server is used to provide a DHCP service.

4. The automatically setting method of claim 2, wherein the ESMS server is used to provide a PXE service and an ESMS service.

5. The automatically setting method of claim 2 wherein the management controller is a baseboard management controller (BMC).

6. The automatically setting method of claim 1, wherein the network parameter setting program is a system management soft (SMS) program.

7. An automatically setting system capable of performing data transmission through a network communications system, the automatically setting system comprising:
    a remote console; and
    a network serving equipment comprising a management controller:
    wherein the network serving equipment issues a request instruction through the network communications system to the remote console, to acquire corresponding IP address information and network parameter setting program to set IP address information of the network controller, and to return a setting result to the remote console, for the remote console to control through the network communications system the network equipment to execute corresponding operations.

8. The automatically setting system of claim 7, wherein the remote console comprises a DHCP server and an ESMS server for providing a PXE service and an ESMS service.

9. The automatically setting system of claim 7, wherein the network serving equipment is set in a PXE mode.

10. The automatically setting system of claim 7, wherein the management controller is a BMC.

11. The automatically setting system of claim 7, wherein the network parameter setting program is an SMS program.

* * * * *